Patented July 10, 1951

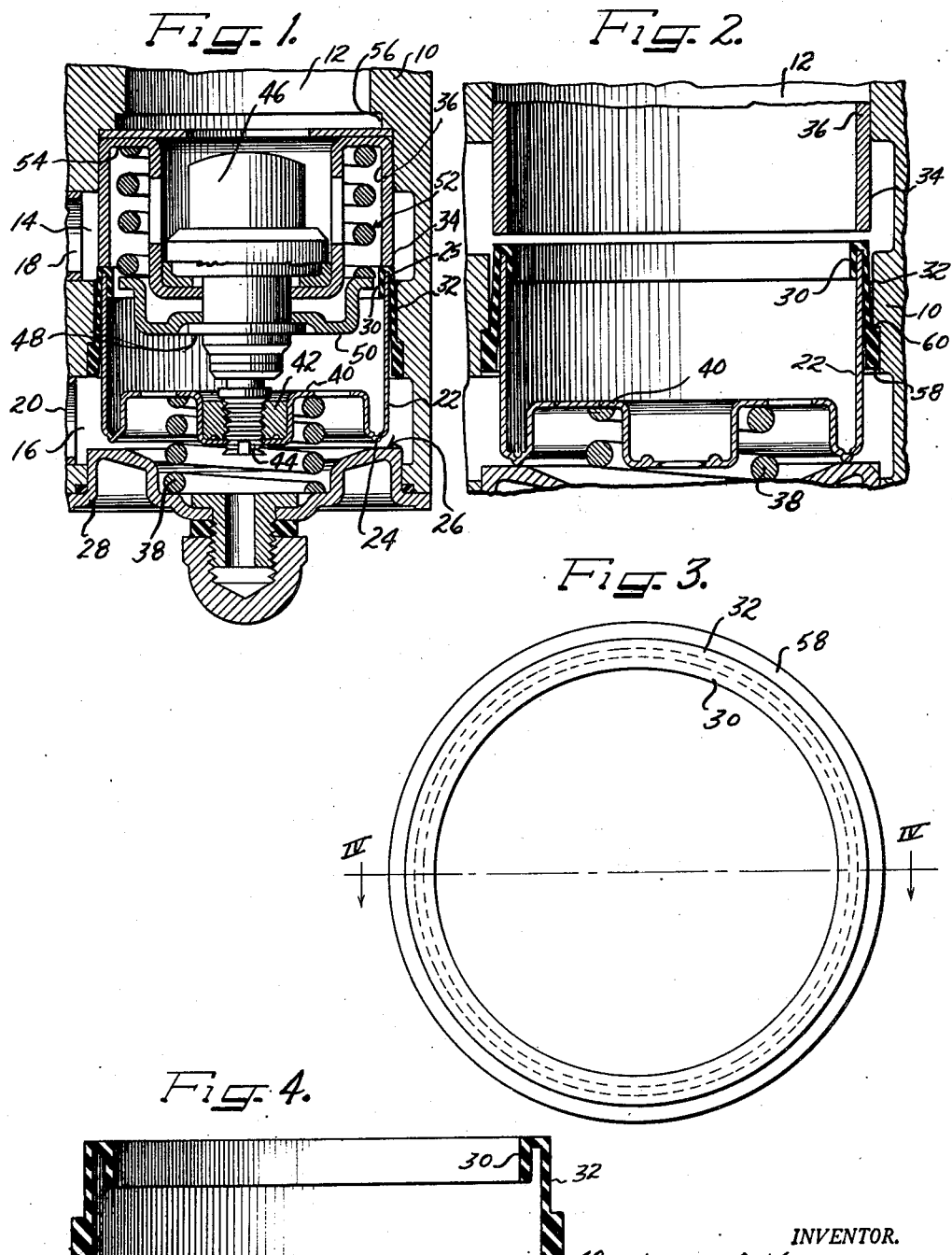

2,560,294

UNITED STATES PATENT OFFICE 2,560,294

PISTON SEAL BOOT

Leslie A. Kempton, St. Petersburg, Fla., assignor to The Dole Valve Company, Chicago, Ill., a corporation of Illinois Application January 2, 1947, Serial No. 719,829

5 Claims. (Cl. 251—22)

My invention relates to piston sealing devices for use in fluid control valves and the like.

It is an object of my invention to provide an improved piston seal device for use in valve structures.

It is a further object of my invention to provide an improved piston sealing device which may be used in fluid valve structures and the like and which does not require sliding fluid-tight contacts.

Another object of my invention is to provide a piston sealing device suitable for use in a valve structure of the type wherein the various cooperating elements are slidably mounted within the valve structure and held in place by means of a single closure element.

Yet another object of my invention is to provide a piston sealing device that not only provides a fluid-tight seal between a piston and the sides of the cavity in which it is contained, but also provides a yielding seat portion capable of more effectively sealing the edge of the piston with the surface engaged by it.

The novel features which I believe to be characteristic of my invention are set forth with particularity in the appended claims. My invention, itself, however, both to its organization and method of operation, together with further objects and advantages thereof may best be understood by reference to the following description taken in connection with the accompanying drawings:

On the drawings:

Figure 1 is an axial cross sectional view of a fluid mixing valve incorporating the features of my invention;

Figure 2 is an enlarged view showing the boot structure of the valve of Figure 1;

Figure 3 is a view of the boot of the valve of Figure 1 as seen from the top; and Figure 4 is a cross sectional view along axis IV—IV of Figure 3.

As shown on the drawings:

In Figure 1, 10 is the body structure of a fluid control valve, the valve shown in the figure being a temperature sensitive fluid mixing valve of a type to which this invention is particularly applicable. It is the function of this valve to mix streams of fluid from separate sources in a cavity 12 and in such proportion as to maintain constant fluid temperature therein. Cavity 12 is provided with two annular fluid inlet chambers 14 and 16, the former being connected to a source of cold fluid and the latter being connected to a source of hot fluid. Fluid flow to chambers 14 and 16 takes place through apertures 18 and 20, respectively.

The structure of the fluid mixing valve shown in Figure 1 forms no part of the present invention, this structure constituting the subject matter of applicant's copending patent applications, Serial Nos. 719,827, 719,828 and 719,826, filed all on January 2, 1947, all assigned to the same assignee as the present invention, application Serial No. 719,828 having issued as Patent No. 2,553,769, May 22, 1951.

Control of the relative proportion of hot and cold fluid admitted to cavity 12 is achieved by the motion of the piston 22 along the axis of cavity 12. Downward motion of this piston causes the lower portion 24 thereof to engage the upper surface 26 of closure element 28 to cut off flow of hot fluid from chamber 16. Upward motion of piston 22 causes engagement of the upper portion 25 with the downwardly extending seat portion 34 of support 36, the overlaying portion 30 of boot 32 forming a seal or seat between these members to provide a minimum degree of fluid leakage in this engagement.

In the valve of Figure 1, the elements forming the fluid control mechanism are held in place by closure element 28. Spring 38 rests against element 28 and exerts force against the inwardly extending portion 40 of piston 22, thereby biasing piston 22 in the upward direction. In addition, portion 40 of element 22 is threadedly attached by insert 42 to the screw threaded extension 44 of temperature sensitive element 46. Thus, spring 38 provides upward bias on element 46, which bias is opposed by flange 48 acting against washer 50, the latter element being downwardly biased by the action of spring 52 which is restrained from upward motion by the upper portion 54 of support 36. Support 36 cannot move upwardly because of the inwardly extending portion 56 of cavity 12. Since each of the elements in cavity 12 is fixed in position by the action of support 54 and closure 28, it is unnecessary to to provide additional anchoring means and the entire assembly may be made by merely placing these elements in position and anchoring closure 28.

The temperature control member 46, Figure 1, is of a type wherein length increases as the temperature of the fluid within cavity 12 rises. This length change manifests itself in a change in the distance between threaded portion 44 and flange 48. Thus, as the fluid temperature within cavity 12 increases, member 22 is moved downwardly against the action of spring 38 by reason of the increased distance between threaded portion 44 and flange 48 of temperature sensitive element 46. Spring 52 is made sufficiently strong to cause small flexing under this action, so that piston 22 moves with respect to body 10 and hence closure 28 and support 36. This decreases the space between portion 24 of piston 22 and closure 28 to reduce the flow of hot water from chamber 16 to cavity 12 and increases the space between portion 34 of support 36 and piston 22 to cause greater flow of cool water from chamber 14. Consequently, the temperature of the fluid within cavity 12 is decreased and brought more nearly to the desired value. If the temperature of the fluid within cavity 12 is too low, the reverse action takes place and increased hot fluit passes from chamber 16 to cavity 12, and decreased cool fluid passes from chamber 14, thereby increasing the fluid temperature.

It is the purpose of piston seal boot 32 to prevent fluid flow in the space between piston 22 and the inner wall of cavity 12. Proper operation of the valve demands that this seal be provided as otherwise fluid may flow from chamber 16, between piston 22 and the inner wall of cavity 12, and the space between piston 22 and portion 34 of support 36, thereby permitting passage of hot fluid into the cavity 12 independently of the passage between portion 24 of piston 22 and the closure 28. Similarly, leakage between piston 22 and the inner wall of cavity 12 permits flow of cool fluid from chamber 14 through the space between portion 24 of piston 22 and the closure 28. Inasmuch as these types of fluid flow reduce the effectiveness of motion of the piston 22 in varying the supply of fluid to cavity 12, the ability of the valve to maintain constant fluid temperature in cavity 12 is impaired. It is therefore necessary to provide means such as boot 32 to furnish a fluid tight seal between the piston 22 and the inner wall of cavity 12.

The operation and construction of boot 32 can best be understood by reference to Figure 2 which is an enlarged view of the valve of Figure 1 but showing only piston 22 and the members engaged by it to form fluid seals. As shown clearly in this figure, boot 32 overlays the upper portion of element 22 in the region indicated at 30, thereby forming a yielding seat between piston 22 and portion 34 of support 36. The lower portion of boot 32 is held against motion with respect to body 10 by the outwardly extending annular portion 58 which engages the wall 60 formed by a correspondingly recessed portion of cavity 12. Thus, as element 22 is moved upwardly, boot 32 is stretched, being held in engagement with the upper portion of element 22 by the overlaying portion 30 and with the body 10 by the outwardly extending portion 58. Boot 32 is made of rubber or similar material having a high degree of resilience and which is impervious to fluid flow, thereby preventing a permanent set due to motion of piston 22 and avoiding fluid flow between this piston and the inner wall of cavity 12. In addition, boot 32 is designed so that with element 22 in its lower position (shown in Figure 2), the boot is stretched to a slight degree so as to hold a tight engagement against wall 60 and the upper portion of piston 22.

Figure 3 is a top view of boot 32 apart from the valve mechanism, showing clearly the circular configuration thereof. Figure 4 is a cross sectional view of the boot through axis IV—IV, Figure 3. The appearance of the boot in this view differs from that of Figure 2 in that boot, being free to assume its unstretched condition, is of smaller axial length than in Figure 2.

One of the features of this invention resides in the fact that boot 32 is adapted for insertion into the complete valve from a single side. For example, in the fluid valve structure of Figure 1, the entire assembly can be made by placing boot 32 over element 22 and locating the other elements in their relative positions. The entire group can then be inserted in the cavity 12 of body 10 and closure 28 attached in place to complete the assembly. It is thus possible to complete the entire valve by a simple inserting operation and complicating assembly operations are avoided.

Alternatively, the portion 58 of boot 32 may be cemented in place against the wall of body 10.

A further feaure of the boot structure 32 resides in the fact that it is unnecessary to provide precise machining of the lower surface of the downwardly extending portion 34 of support 36 or the upper surface of piston 22. The flexible overlaying portion 30 of boot 32, when pressed between members 22 and 36, expands in all directions and accommodates itself to any variations in the coacting surfaces, thereby providing a fluid tight engagement without exact machining.

While I have shown a particular embodiment of my invention, it will of course be understood that I do not wish to be limited thereto, since many modifications in the elements employed and the structures disclosed may be made without departing from the spirit and scope of my invention. I, of course, contemplate by the appended claims to cover any such modifications as fall within the purview of my invention.

I claim as my invention:

1. A valve having in combination a body with a cavity, said cavity having an inwardly extending wall, a movable piston engageable with said wall to control fluid flow to said cavity, and an open-ended generally cylindrical boot of flexible material overlaying said piston about the surface engaged by said wall and attached to the inner surface of said cavity, said boot encircling said piston in all positions of travel thereof thus providing a fluid tight seal between said piston and said cavity, and the overlying end of said boot providing a valve face between said piston and said wall.

2. A valve having in combination a body with a cavity and an opening for the passage of fluid, and means to control fluid flow between said cavity and said opening, said means including a seat extending into said cavity at a point in proximity to said opening, a movable element to engage said seat, and an open-ended generally cylindrical flexible boot having one end overlaying the end of said element to form a yieldable valve face between said element and said seat, said boot encircling said movable element in all positions of travel thereof along said cavity and being in engagement with the surface of said cavity along which said element moves to form a fluid tight seal therewith so as to prevent fluid flow between said opening and said cavity when said element engages said seat.

3. A valve having in combination a body with a cylindrical cavity and annular opening for the passage of fluid thereto, means to control fluid flow between said cavity and said opening, said means including an annular seat extending into said cavity, a movable piston spaced from the wall of said cavity to engage said seat and cover said opening, and an open-ended generally cylindrical flexible boot having one end overlaying the end of said piston to form a resilient valve face between said element and said seat, said boot being interposed between and in engagement with the surfaces of said cavity and piston to form a fluid tight seal therewith so as to prevent fluid flow between said opening and said cavity when said element engages said seat.

4. A fluid control valve comprising a body with a cylindrical cavity, said cavity having a pair of axially spaced openings for fluid flow, a movable piston in said cavity, means providing seats to be engaged by the opposite ends of said piston, and a flexible elongated open-ended annular boot one end of which overlays one end of said piston to form a valve face therefor and said boot extending along the outer wall of said piston for a portion of the length thereof and being interposed between said piston and the wall of said cavity in all positions of travel of said piston along said cavity engaged with the outer surface of said cavity in the region between said openings so as to form a fluid tight seal between said piston and the wall of said cavity, whereby axial motion of said piston controls the relative quantity of fluid which may flow between said openings over said seats upon such fluid being supplied through said openings.

5. In a fluid control valve, a valve body having a cavity with a cylindrical wall, an inlet into said cavity through said wall, an annular member within said cavity extending along the wall thereof partially over said inlet, the inner end of said annular member forming a valve seat, an annular piston moving along said cavity and forming a fluid passageway member for the passage of fluid therethrough, and valve means engageable with said seat to block the passage of fluid from said inlet to said piston and sealing the space between said piston and cylindrical wall including an elongated flexible generally cylindrical boot secured to said wall at one of its ends and interposed between said piston and wall in all positions of travel of said piston along said wall, said boot extending over the end of said annular piston at its other end for engagement with said seat and forming a valve blocking the passage of fluid through said piston.

LESLIE A. KEMPTON.

REFERENCES CITED

The following references are of record in the file of this patent:

UNITED STATES PATENTS

| Number | Name | Date |
| --- | --- | --- |
| 113,503 | Dinnen | Apr. 11, 1871 |
| 376,129 | Anderson | Jan. 10, 1888 |
| 1,045,399 | Hague | Nov. 26, 1912 |
| 1,118,649 | Halter | Nov. 24, 1914 |
| 2,016,997 | Hartke | Oct. 8, 1935 |
| 2,016,998 | Hartke | Oct. 8, 1935 |
| 2,054,909 | Morehouse | Sept. 22, 1936 |
| 2,172,079 | Boehm | Sept. 5, 1939 |
| 2,216,292 | Evleth | Oct. 1, 1940 |